United States Patent
Cole, Jr. et al.

[11] Patent Number: 5,192,253
[45] Date of Patent: Mar. 9, 1993

[54] SINGLE PIN ROCKER JOINT CHAIN

[75] Inventors: Edward H. Cole, Jr., Ithaca; Philip J. Mott, Dryden, both of N.Y.

[73] Assignee: Borg-Warner Automotive Transmission & Engine Components Corporation, Sterling Heights, Mich.

[21] Appl. No.: 778,409

[22] Filed: Oct. 17, 1991

[51] Int. Cl.⁵ .............................................. F16G 13/04
[52] U.S. Cl. ...................................... 474/214; 474/229
[58] Field of Search ............................... 474/212–217, 474/226, 228–231

[56] References Cited

U.S. PATENT DOCUMENTS

| | | | |
|---|---|---|---|
| 1,496,298 | 6/1924 | Chapman | 474/213 X |
| 1,564,798 | 2/1924 | Sturtevant . | |
| 1,644,656 | 2/1925 | Belcher . | |
| 1,651,832 | 12/1925 | Morse . | |
| 1,769,960 | 7/1930 | Morse | 474/215 X |
| 1,868,334 | 7/1932 | Morse | 474/215 X |
| 1,947,734 | 3/1933 | Perry . | |
| 1,951,764 | 3/1934 | Morse | 474/214 X |
| 1,974,338 | 7/1932 | McCann . | |
| 2,067,243 | 1/1937 | Perry | 474/215 |
| 2,266,688 | 12/1941 | Keller | 474/214 X |
| 2,413,843 | 12/1963 | Perry . | |
| 2,667,791 | 2/1954 | Bremer | 474/214 |
| 2,667,791 | 2/1954 | Bremer . | |
| 2,956,442 | 10/1960 | Krekeler | 474/229 |
| 3,213,699 | 12/1963 | Terepin . | |
| 3,605,514 | 4/1969 | Mitchell | 474/229 |
| 3,636,788 | 1/1972 | Jeffrey . | |
| 4,337,057 | 6/1982 | Horowitz et al. | 474/242 |
| 4,342,560 | 8/1982 | Ledvina et al. | 474/157 |
| 4,507,106 | 3/1985 | Cole, Jr. | 474/215 |
| 4,759,740 | 7/1988 | Cradduck | 474/212 |
| 4,911,682 | 3/1990 | Ivey et al. | 474/245 |
| 4,986,799 | 1/1991 | Holweg | 474/240 |
| 5,007,883 | 4/1991 | Cole, Jr. et al. | 474/242 |

FOREIGN PATENT DOCUMENTS 26652 of 1905 United Kingdom ................ 474/215

Primary Examiner—Carl D. Friedman
Assistant Examiner—Roger J. Schoeppel
Attorney, Agent, or Firm—William Brinks Olds

[57] ABSTRACT

A rocker joint for a power transmission chain is formed from a single pin and an associated link aperture. The pin has a substantially flat front surface and a convex back surface, with the back surface being defined by a plurality of radii. The pin is received in the aperture of the link such that the front surface of the pin engages and rocks on the curved surface of the link aperture. The back surface of the pin is movable in the aperture of the links as the surfaces move relative to one another when the chain articulates.

30 Claims, 2 Drawing Sheets

SINGLE PIN ROCKER JOINT CHAIN

BACKGROUND OF THE INVENTION

Reference is made to co-pending U.S. application Ser. No. 07/778,402, filed Oct. 17, 1991, to Philip J. Mott, entitled "Single Pin Rocker Joint Bushing Chain," which is related to the subject matter of the present application and is incorporated herein by reference.

1. Field of the Invention

The present invention relates generally to power transmission chains and particularly to an improved rocker joint for such chains. The rocker joint is formed from a single pin and an associated link aperture. The invention has application to power transmission chains of the silent chain variety, as well as power transmission chains for use with variable pulley transmissions (continuously variable transmissions).

2. Description of the Prior Art

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or laterally adjacent to each other. Each link has a body with a pair of spaced apertures and the apertures of one set of links are arranged and aligned with the apertures of the next adjacent set of interleaved links. The links have a pair of depending toes separated by a crotch.

The links are connected by pivot means, which are typically round pins received in the link apertures. The pivot means can also comprise a rocker joint, which may include a pin and a rocker. Each pin and rocker has a front face which contact and rock on each other. An example of silent chain is found in U.S. Pat. No. 4,342,560, which is incorporated herein by reference. An example of silent chain which can be used in engine timing applications is found in U.S. Pat. No. 4,759,740, which is also incorporated herein by reference.

A second type of power transmission chain is used to transfer power between a pair of variable pulleys in a continuously variable transmission. The chain links are provided in sets that are interleaved together. The links have aligned apertures for receiving pivot means. The pivot means can provide the means for the transfer of power between the chain and the sheaves of the pulley by allowing the sheaves to directly contact the ends of the pivot means in a driving engagement.

Load blocks or load carrying means that are positioned on the chain between the spaced pivot members can also provide the means for transfer of power between the pulleys. The load blocks can be in the form of struts that are carried in a passageway below the links. Alternatively, the load blocks can extend around the links of the chain and have one or more windows for receiving the chain links therein. The load blocks have tapered outer or end surfaces which engage the sheave faces of the pulleys to provide the driving engagement between the pulleys and the chain. Examples of power transmission chains suitable for use in a continuously variable transmission are shown in U.S. Pat. No. 4,911,682, U.S. Pat. No. 4,507,106, and U.S. Pat. No. 5,007,883, which are incorporated herein by reference.

The present invention relates to an improved rocker joint for power transmission chain. Rocker joints for chains are known in the art. Rocker joints are utilized in an attempt to attain higher efficiencies and less wear than comparable round pin joints. Round pin joints typically produce higher wear as a result of the sliding action between the round pin and the inside of the circular link aperture, as the chain articulates. In contrast, rocker joints provide a lower wear joint on account of the rocking action between the pin and the rocker portion, as the chain articulates.

U.S. Pat. No. 4,507,106 discloses a rocker joint in which, in the preferred embodiment, each pin or rocker has the identical cross-section. Each pin has a front surface which rocks on the front surface of the adjacent pin. In the preferred embodiment, the pins have a front surface defined by a first radius, and a back surface defined by a second and a third radius, both progressively smaller than the first radius. The rocker joint comprises a pair of pins fitted into each group of aligned apertures in the interleaved sets of links to join the links and permit articulation.

U.S. Pat. No. 4,911,682 discloses a rocker joint that includes a pair of pins. The rocker joint has apertures that are a generally hour-glass shape with the enlarged ends receiving the pins. The front surfaces of the pins rock against one another, while the back surfaces of the pins are prevented from substantial rotation by the curvature of the apertures.

These prior art patents represent examples of rocker joints utilizing two pivot members or pins, or a pin and a rocker. The present invention relates to single pin rocker joints in which a single pin rocks against the link aperture. U.S. Pat. No. 2,667,791 discloses a silent chain with a single pin rocker joint. The chain has a single pin with an arcuate periphery, defined by a single radius, and a relatively flat bearing surface. The link has a generally semi-circular aperture with an arcuate bearing surface. The flat surface of the pin rocks against the arcuate surface of the link aperture.

Another type of single pin rocker joint is shown in U.S. Pat. No. 4,337,057. The patent discloses a double unrolling hinge for a chain-belt for a variable pulley transmission. Both sides of the hinge pin contact the insides of the link apertures.

U.S. Pat. No. 1,564,798 also discloses a single pin, double-edged rocking joint. The pin is thicker in the center section than at the top and bottom. The formation of the link aperture allows the sides of the pin to roll against the aperture sides of adjacent, interleaved links.

The present invention provides an improved single pin rocker joint for a power transmission chain. The construction of the pin includes a substantially flat rocking surface and an arcuate surface formed of a plurality of radii. A clearance between the back surface of the pin and the associated aperture permits movement of the pin with respect to the aperture. The chain includes inside links and guide links and has application in timing drives as well as drives for continuously variable transmissions.

SUMMARY OF THE INVENTION

In accordance with one embodiment of this invention, a power transmission chain is constructed of an assembly of links and pivot members. The chain includes a plurality of sets of guide links interleaved with sets of inside links. Each guide link and inside link has a pair of spaced apertures. To assemble the chain, the apertures of one link set are transversely aligned with one set of apertures of the next adjacent link set.

The apertures are defined by a series of surfaces. The apertures within the guide links have at least one curved surface and the apertures within the inside links have a plurality of curved surfaces.

Pivot members, in the form of pins, are fitted within the apertures of the links. The pins have a substantially flat front surface and a convex back surface. The pivot member back surface is defined by a first radius. The pivot members are press fit in the apertures of the guide links such that the pivot member back surface engages the curved surface defined by the guide link. The press fit prevents substantial rotation of the pin relative to the guide link.

As a result of a minimal clearance between the back surface of the pin and the associated aperture of the inside links, the back surfaces of the pivot members are allowed to move freely within the apertures of the inside links of the chain. The front surface of the pivot member and a curved surface of the inside link aperture engage and rock on one another with a rolling type action.

The apertures of the inside links are formed by a series of radii. The inside link apertures are rotated with respect to a horizontal centerline of the body of the link in order to provide a positive tilt angle. In contrast, the apertures of the guide links have a flat surface that matches the flat surface of the pin. The flat surfaces of the apertures of the guide links are perpendicular with respect to the horizontal centerline of the link as well as the pitch line of the link. The apertures of the inside links are formed and spaced to provide a pitch length that is greater than the pitch length of the guide links.

The rocker joint of the present invention may be used in an inverted tooth silent chain or in a power transmission chain for a continuously variable transmission. In the silent chain use, the inside links include a pair of depending teeth that are formed to contact a sprocket for driving of the chain. In the use for a continuously variable transmission, the links include load carrying members in the form of load blocks. The load blocks may extend around the links or through a passageway formed in the base of the links. Alternatively, the pins may contact the pulley sheaves to provide the power transfer.

The rocker joint of the present invention has preferred use in a timing chain application of inverted tooth links that are laced in a block form. In such a construction, the inside links are substantially identical and placed side-by-side in a row to form a block. Rows or sets of such block laced inside links are preferably alternated with guide link rows. The sets with guide links do not contain any inside links. Similarly, the rocker joint can be used in a continuously variable transmission chain that is laced in block form.

Use of the single pin rocker joint of the present invention provides several advantages over the use of a round pin chain. The rocker joint provides generally higher efficiencies than the round pin joint with lower wear. Moreover, the single pin rocker joint of the present invention presents advantages over the double-pin rocker joint design of the prior art by its elimination of the additional pin.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale.

DETAILED DESCRIPTION OF THE DRAWINGS

Figure 1:
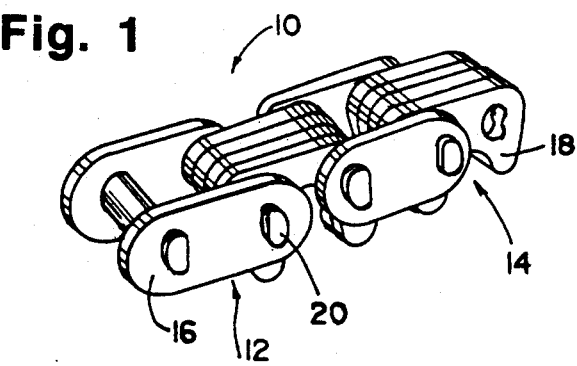
FIG. 1 is a perspective view of a segment of the chain of the present invention, with inverted tooth links and block lacing.

Turning now to the drawings, FIG. 1 illustrates a portion of a power transmission chain generally at 10. The chain includes sets or rows of interleaved links. In the embodiment of FIG. 1, the chain includes guide link rows 12 interleaved with inside link rows 14. The guide link rows are comprised of guide links 16, while the inside link rows are comprised of inside links 18. The guide links 16 are shown more clearly in FIG. 3 and the inside links are shown more clearly in FIG. 2. In the preferred embodiment, the sets of inside links are laced in blocks and the sets of guide links do not include inside links.

The complete chain drive (not shown) includes an endlessly connected chain 10 wrapped about at least a pair of sprockets. The sprockets are mounted on shafts, such as an engine crankshaft or engine camshaft. The sprockets may be of different diameters and may have a different number of differently shaped teeth. The chain and sprocket system can also include an idler sprocket.

Figure 6:
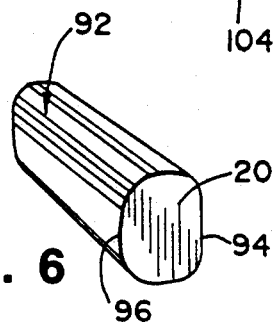
FIG. 6 is a perspective view of the pin of FIG. 5.

The rows or sets of links are formed of a plurality of links placed in side-by-side relationship. The links of the interleaved set are preferably alternated with the links of the first set. The adjacent sets of links are joined by pivot means 20, which are illustrated in FIG. 6 as pins with a flat front working surface and an arcuate back surface. The pivot means are received in aligned sets of apertures 22, 24, 26, 28. Each link preferably includes a pair of apertures located at opposite ends of the link.

In the silent chain embodiments, the guide links 16 maintain the lateral alignment of the chain on the sprockets. The guide links are along the outside of the chain and have no driving engagement with the sprocket teeth. Thus, the guide links are distinguished from the inside links 18, or driving links, by their lack of sprocket tooth contacting members. An inside guide link (not shown) may also be used in which case the sprocket is grooved to receive the inside guide link. The pivot means 20 is shaped for a press fit within the apertures 26, 28 of the guide links. The pivot means is typically peened over to maintain the integrity of the chain assembly; however, other methods may be used if desirable. In the embodiments of the present invention which have applications with continuously variable transmissions, the guide links act to secure the pins. The guide links are placed along the outside rows of the chain.

Figure 4:
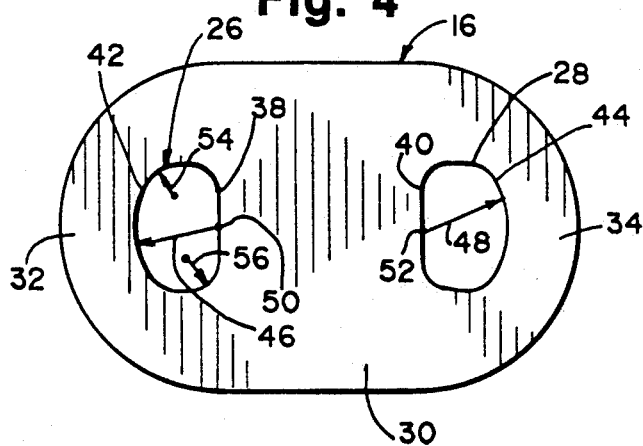
FIG. 4 is a side view of a link form for a guide link used in the chain of the present invention.

The guide link is illustrated in FIG. 4. The guide link is defined by body portion 30 and end portions 32, 34. The guide link apertures have substantially flat surfaces 38, 40, which are both oriented toward the inside body portion 30 of the link. The back surfaces 42, 44 of the apertures are formed by radii 46, 48, which are struck from center points 50, 52. The radii center points 50, 52 are preferably located between the apertures 26, 28, within the body portion of the link. The apertures each contain additional connecting arcs with connecting radii 54, 56, which are shown only for aperture 26. The pitch of the guide link is measured as the distance between the flat surfaces 38, 40 of the apertures, along the pitch line of the link.

Figure 2:
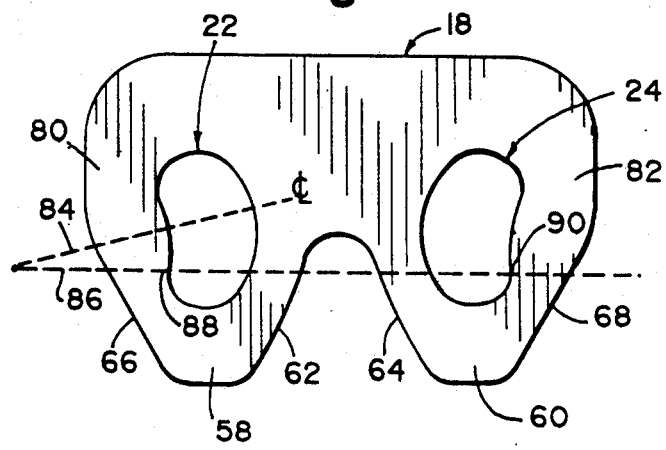
FIG. 2 is a side view of a link form for an inside link used in the chain of the present invention.
Figure 3:
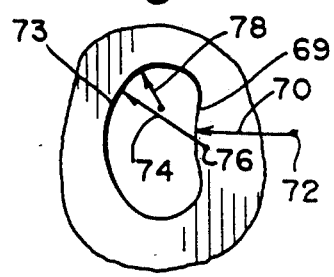
FIG. 3 is a detail of the aperture of the link of FIG. 2.

Inside links 18 are interleaved with the guide links 16. Link 18 is illustrated in FIG. 2 and is defined by a pair of spaced toes 58, 60. The toes are defined by inside flanks 62, 64 and outside flanks 66, 68. The apertures are defined by a plurality of arcs, which are more clearly shown in the detail of FIG. 3. The front surface 69 is formed by an arc of radius 70 which is struck from centerpoint 72. The back surface 73 is formed by an arc of radius 74 which is struck from centerpoint 76. The connecting surfaces 77 are formed by a plurality of arcs, such as the arc struck from radius 78. The radii centerpoints of the apertures of the inside link are preferably located on opposite sides of the apertures, toward the end portions 80, 82 of the link.

The apertures of the inside links are each symmetrical about a centerline. The centerline 84 is shown for the left aperture 22. The right aperture 24 has a similar symmetrical centerline (not shown). The apertures are rotated about the pitch line 86 of the link to form a positive tilt angle.

The preferred aperture tilt angle of the inside link is approximately 6 degrees, which is the angle between the symmetrical centerline and the pitch line of the link. This is in contrast to the guide links 16 which have zero aperture tilt. The pitch length of the inside links is measured along the pitch line, between the points of intersection 88, 90 of the apertures with the pitch line. The pitch points 88, 90 are the points of vertical tangency of the aperture inside front surface. The location of the pitch line in the link is determined by the link tooth form as well as the design of the sprocket. The pitch length of the inside link is greater than the pitch length of the guide link.

Figure 5:
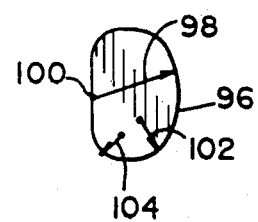
FIG. 5 is a detail of the cross-section of a pin used in the chain of the present invention.

The pin 20 is illustrated in FIG. 6, with the detail of the cross section shown in FIG. 5. The pin includes a body portion 92, which has a substantially flat front working surface 94 and arcuate back surface 96. The back surface 96 is constructed of arcs formed by a plurality of radii. These radii include radius 98, struck from centerpoint 100 and radii 102, 104.

Figure 7:
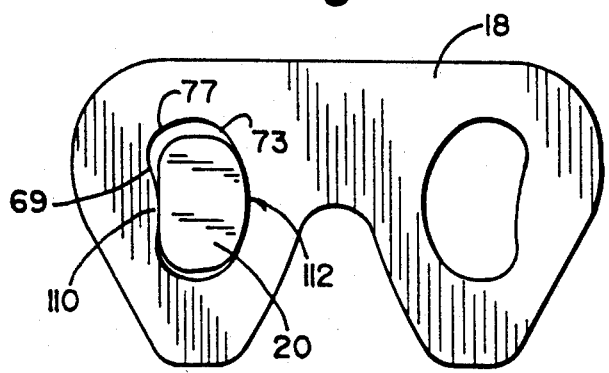
FIG. 7 is a schematic side view of the inside link and pin illustrating the position of the pin in the link aperture in the straight chain pull position.
Figure 8:
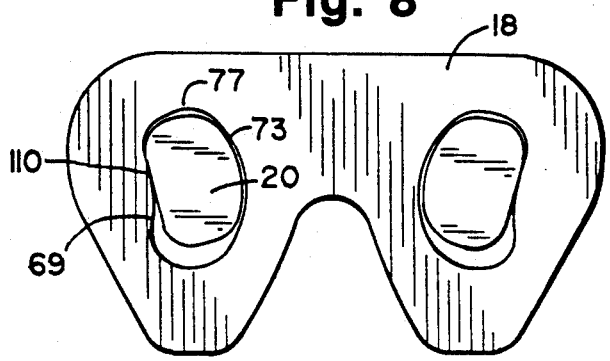
FIG. 8 is a schematic side view of the inside link and pin illustrating the position of the pin in the link aperture in the fully articulated position.
Figure 9:
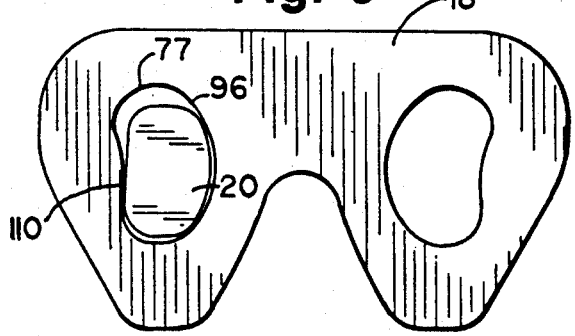
FIG. 9 is a schematic side view of the inside link and pin illustrating the position of the pin in the link aperture in the backbend position.

In operation, the movement of the pin 20, of the rocker joint relative to the links of the chain, is illustrated in FIGS. 7, 8, and 9. FIG. 7 illustrates the pin in the straight-pull position of the chain. In such a position, the chain is extended between two sprockets and the link is being viewed in the tight strand portion of the chain. The rocking contact of the flat front surface of the pin occurs with the front arcuate portion of the aperture at contact point 110. In the straight-pull position of FIG. 7, the rocking contact points are the points of vertical tangency 88, 90, shown in FIG. 2. The rocking occurs along a portion of the flat surface of the pin as a rolling type action. This rolling action is in contrast to the sliding of a round pin within a round aperture of a round pin joint. A small pin-to-aperture clearance is provided at point 112, which is opposite the side of the rocking contact point 110. The minimal clearance at point 112 between the back surface 96 of the pin and the back surface 73 of the aperture allows substantially free movement of the back surface of the pin relative to the link, as the chain articulates. In the straight-pull position, the tight strand of the chain allows for the clearance between the pin and aperture on the back surfaces.

The pin 20 moves relative to the link to the position shown in FIG. 8, where the link is fully articulated. In the fully articulated position, the chain has wrapped around the sprocket and the link is being viewed in a position of being fully seated in the sprocket. Preferably, a minimum clearance between the back surface of the pin and the aperture surface is maintained in this position.

In a timing chain drive application, the chain is provided with a back-bending or flexing ability. In such a motion, the pin 20 moves relative to the link to the position shown in FIG. 9. In this position, the slack side of the chain has been forced to an inward position by a chain snubber and the link is being viewed in the fullest position of backbending.

Figure 11:
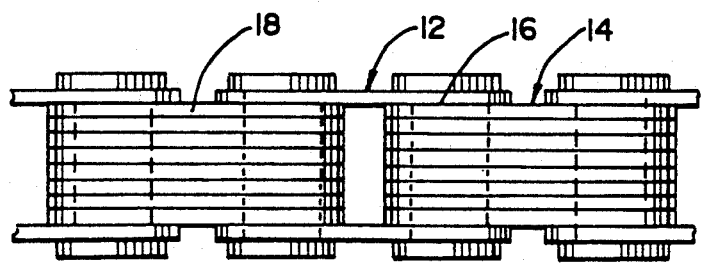
FIG. 11 is a plan view of the chain of the present invention in a block lacing construction.

In the preferred embodiment, the chain of the present invention is constructed with a block lacing. Such a block lacing is illustrated in FIG. 11. An example of block lacing in chain for an engine timing drive is also shown in U.S. Pat. No. 4,759,740. The inside links are substantially identical and placed side-by-side in the row to form a block. Rows or sets of such block laced inside links are preferably alternated with guide link rows. The sets of guide links do not contain any sprocket tooth contacting members. That is, they do not contain any inside links.

In the block laced construction, the curved portion of the apertures of the inside links in the block act together to form a continuous curved surface, which is substantially continuous across the width of the chain, for rocking contact with the pin. The inside curved surface of the apertures of the block laced links therefore, effectively, forms a rocker for rocking action against the pin.

The block construction also allows use of the single pin with a single type of inside link. Without the block lacing construction, inside links would be present in the guide link row. To place inside links in the guide row requires a second type of inside link, with the apertures reversed in direction, to permit lacing of the chain.

The use of the single pin rocker joint of the present invention in the block lacing construction combines the benefits of the block lacing with the benefits of a rocker pin joint. The rocker joint is generally of higher efficiency than a round pin joint of comparable size and has generally lower wear characteristics.

Figure 10:
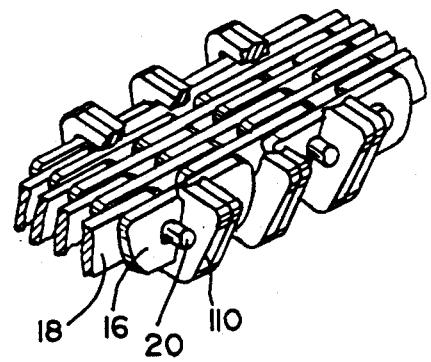
FIG. 10 is a perspective view of a segment of the chain of the present invention for use in a continuously variable transmission, including load block members.

The single pin rocker joint of the present invention can be used with silent chain, as described, or also with a chain used for a continuously variable transmission. An example of a portion of such a chain is shown in FIG. 10. In such a chain, the power transfer occurs through load block members 110 that either encircle the links or are placed in a passageway beneath the links. The sample chain in FIG. 10 includes the single pin 20 with the guide links 16 and inside links 18. The inside links in the guide row would require apertures that are similarly shaped, but slightly larger, than the apertures in the guide links in order to permit articulation of the links with respect to the pins. The guide row inside link apertures would also be in the opposite directions of the apertures of the non-guide row inside link apertures. The inside links are preferably not block laced in order to provide support for the load block 110. However, the inside links may also be block laced. An example of a power transmission chain for use in a continuously variable transmission, with load block members encircling the links, is shown in U.S. Pat. No. 4,507,106. Alternatively, the power transfer can occur through the pins that contact the pulley sheaves.

The combination of the rocker joint of the present chain with other types of chain and configurations of links is also possible. For example, the single pin rocker joint can be used in silent chain in which the configurations of the links are mixed.

While several embodiments of the invention have been described and illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A rocker joint for a chain constructed of an assembly of links and pivot members, said chain comprising a plurality of sets of interleaved links, each link having a pair of spaced apertures, the apertures of one link set being transversely aligned with one set of apertures of the next adjacent link set, said apertures being defined by a series of surfaces, at least one of said aperture surfaces being convexly arcuate, at least one of said pivot members having a substantially flat front surface and a convex back surface, said back surface being defined by a plurality of radii, said pivot member being received in the apertures of some of said links such that the front surface of said pivot member and said convexly arcuate surface of said link aperture engage and rock on one another, the back surface of said pivot member being positioned for clearance from said aperture back surface in the chain tight strand as the surfaces move relative to one another before the chain articulates.

2. The rocker joint of claim 1 wherein said chain includes a plurality of sets of guide links interleaved with sets of inside links.

3. The rocker joint of claim 2 wherein said apertures within said guide links have at least one curved surface and said apertures within said inside links have a plurality of curved surfaces.

4. The rocker joint of claim 3 wherein said pivot member is received in the aperture of said guide link such that said pivot member back surface engages the curved surface defined by said guide link, thereby preventing substantial rotation of said pivot member relative to said guide link.

5. The rocker joint of claim 3 wherein said pivot member is received in the apertures of the interleaved set of inside links, the front surface of said pivot member and a convexly curved surface of said aperture of said inside link engaging and rocking on one another.

6. The rocker joint of claim 5 wherein said inside link aperture includes a curved front surface and a curved back surface, said pivot member back surface and said aperture back surface being in generally spaced apart relation when the rocker joint is oriented in the straight-pull position of the chain.

7. The rocker joint of claim 6 wherein said pivot member back surface and said aperture back surface are in generally spaced apart relation for substantially all positions of the chain.

8. The rocker joint of claim 5 wherein said pivot member is a single pin of continuous cross-section having a generally flat front working surface and a convex back surface, said pin front and back surfaces being connected by a series of curved surfaces.

9. The rocker joint of claim 5 wherein said apertures of said inside links include at least two convex curves, each of said convex curves being defined by a radius having a center point, each center point of each of said radii being on the same side of the aperture.

10. The rocker joint of claim 9 wherein said apertures of said inside links are located between the center points of the radii forming said apertures.

11. The rocker joint of claim 1 wherein said chain includes a plurality of sets of interleaved links, some of said sets of links include a load carrying means.

12. A power transmission chain constructed of an assembly of links and pivot members, said chain comprising a plurality of sets of guide links interleaved with sets of inside links, each link having a pair of spaced apertures, the apertures of one link set being transversely aligned with one set of apertures of the next adjacent link set, said apertures being defined by a series of surfaces, said apertures within said guide links having at least one curved surface, said apertures within said inside links having a plurality of convexly curved surfaces;

said pivot members having a substantially flat front surface and a convex back surface, said back surface being defined by a plurality of radii, said pivot members being received in the apertures of said guide links such that said pivot member back surface engages the curved surface defined by said guide link, thereby preventing substantial rotation of said pivot member relative to said guide link, said pivot member being received in the apertures of the interleaved set of inside links, the front surface of said pivot member and a convexly curved surface of said inside link aperture engaging and rocking on one another, the back surface of said pivot member being positioned for clearance from said aperture back surface in the chain tight strand as the surfaces move relative to one another before the chain articulates.

13. The power transmission chain of claim 12 wherein said pivot member is a single pin having said flat front working surface and said back convex surface being connected by a series of curved surfaces.

14. The power transmission chain of claim 12 wherein said inside links include apertures having at least two convex curves, each of said convex curves being defined by a radius having a center point, each center point of each of said radii being on the same side of the aperture.

15. The power transmission chain of claim 14 wherein said inside links include apertures located between the center points of said radii of said convex curves.

16. The power transmission chain of claim 14 wherein said chain includes inside links having apertures located outside the center points of said radii of said convex curves.

17. The power transmission chain of claim 14 wherein said inside links include apertures having a positive tilt angle.

18. The power transmission chain of claim 12 wherein said inside links have a pitch length of a first distance, said guide links having a pitch length of a different distance.

19. The power transmission chain of claim 18 wherein said pitch length of said inside links is greater than said pitch length of said guide links.

20. The power transmission chain of claim 12 wherein said guide links include apertures having a substantially flat portion.

21. The power transmission chain of claim 20 wherein said aperture flat portion is located perpendicular to a horizontal link pitch line.

22. The power transmission chain of claim 12 wherein said inside links include a pair of toes separated by a crotch.

23. A power transmission chain for use with a sprocket, said chain constructed of an assembly of links and pivot members, said chain comprising a plurality of sets of guide links interleaved with sets of inside links, each link having a pair of spaced apertures, the apertures of one link set being transversely aligned with one set of apertures of the next adjacent link set, said apertures being defined by a series of surfaces, said sets of inside links having links with pairs of depending toes stacked adjacent to each other thereby forming blocks, said sets of inside links being alternated with and separated by sets of guide links, said sets of guide links having pairs of flanking guide links, said apertures within said guide links having at least one curved surface, said apertures within said inside links having a plurality of curved surfaces;

said pivot members having a substantially flat front surface and a convex back surface, said back surface being defined by a first radius, said pivot members being received in the apertures of said guide links such that its back surface engages the curved surface defined by said guide link, thereby preventing substantial rotation of said pivot member relative to said guide link, said pivot member being received in the apertures of the interleaved set of inside links, the front surface of said pivot member and a curved surface of said inside link aperture engaging and rocking on one another, the back surface of said pivot member being movable in the aperture of the links as the surfaces move relative to one another when the chain articulates.

24. The power transmission chain of claim 23 wherein said inside links being constructed and arranged to contact the teeth of a sprocket.

25. The power transmission chain of claim 23 wherein said inside links are substantially identical.

26. The power transmission chain of claim 23 wherein said pivot member is a single pin having said flat front working surface and said back convex surface being connected by a series of curved surfaces.

27. The power transmission chain of claim 23 wherein said inside links include apertures having at least two convex curves, each of said convex curves being defined by a radius having a center point, each center point of each of said radii being on the same side of the aperture.

28. The power transmission chain of claim 23 wherein said inside links include apertures located between the center points of said radii of said convex curves.

29. The power transmission chain of claim 23 wherein said inside links include apertures having a positive tilt angle.

30. The power transmission chain of claim 23 wherein said inside links have a pitch length of a first distance, said guide links having a pitch length of a different distance.

* * * * *